United States Patent [19]

DeCarlo et al.

[11] Patent Number: 4,693,114
[45] Date of Patent: Sep. 15, 1987

[54] GYROCOMPASS NAVIGATION SYSTEM FOR LAND VEHICLES

[75] Inventors: Frank S. DeCarlo, Paramus; Frank L. Rosen, Parsippany, both of N.J.

[73] Assignee: Allied Corporation, Morris Township, Morris County, N.J.

[21] Appl. No.: 859,542

[22] Filed: May 5, 1986

[51] Int. Cl.⁴ .............................................. G01C 21/00
[52] U.S. Cl. ..................................... 73/178 R; 33/320
[58] Field of Search .............. 73/178 R; 33/320, 324; 364/453

[56] References Cited

U.S. PATENT DOCUMENTS

| | | | |
|---|---|---|---|
| 3,254,419 | 6/1966 | Hurlburt | 33/226 |
| 3,394,596 | 7/1968 | Wehde et al. | 74/5 |
| 4,061,995 | 12/1977 | McCrickert | 33/363 K |
| 4,158,261 | 6/1979 | Auer | 33/324 |
| 4,321,678 | 3/1982 | Krogmann | 33/320 |
| 4,443,952 | 4/1984 | Schulien et al. | 33/324 |
| 4,458,426 | 7/1984 | O'Connor et al. | 33/325 |

FOREIGN PATENT DOCUMENTS 2090973A 7/1982 United Kingdom .

Primary Examiner—Donald O. Woodiel
Attorney, Agent, or Firm—Howard G. Massung; Anthony F. Cuoco

[57] ABSTRACT

A gyrocompass navigation system for land vehicles is disclosed which includes self-contained heading and navigation means. The system determines the orientation of the vehicle with respect to grid north; provides land navigation information in universal transverse mercator (UTM) coordinates (northings and eastings); and provides range and bearing information for destination location. The system features a single degree of freedom gyroscope for both north seeking and navigational modes and further includes simplified means for tilt measurement and temperature compensation.

12 Claims, 3 Drawing Figures

GYROCOMPASS NAVIGATION SYSTEM FOR LAND VEHICLES

BACKGROUND OF THE INVENTION

Modern battlefield scenarios require knowledge of the present position of tactical land vehicles. This knowledge is essential for maximizing vehicle survivability through rapid mobility.

Indirect fire mobile weapons systems such as mobile howitzers and missile launchers require accurate weapons pointing and present position data due to the range of their targets.

Other vehicles such as, for example, direct fire mobile weapons systems, resupply vehicles and transport vehicles also benefit from present position data, although the same is not needed with the accuracy required by other vehicles, as aforenoted.

Accordingly, the present invention provides relatively low cost, moderate accuracy land navigation capability for tactical vehicle applications such as fast attack vehicles, transport vehicles, resupply vehicles, robotic vehicles and the like.

The invention further provides relatively low cost backup heading and land navigation capability for mobile weapons systems and the like which already have relatively high cost, precision heading and navigation capability.

The invention features a single axis (azimuth) system which provides two-dimensional universal transverse mercator (UTM) coordinates (northings and eastings). The system uses a single degree of freedom gyroscope (gyro) used in both north seeking and navigational (directional gyro) modes. Simple level sensors rather than complicated accelerometers are used for tilt measurement, whereby excessive gimballing is eliminated. Temperature compensation is achieved through temperature modelling, i.e. thermistors rather than temperature controlling with high power requirements.

SUMMARY OF THE INVENTION

This invention contemplates a gyrocompass navigation system for land vehicles including self-contained heading and navigation means. The system determines the orientation of the vehicle with respect to grid north; provides land navigation information in UTM coordinates (northings and eastings); and provides range and bearing information for destination location.

Signals provided by a distance measurement transducer as a function of vehicle distance travelled are accumulated and a microprocessor resolves the accumulated distances into northings and eastings using heading information provided by a single axis gyro platform. Current northings and eastings are incrementally summed with initial values applied to the system by a navigation/control display unit.

The system operates in two primary and three secondary modes of operation. The primary modes of operation are initialization and navigation. The secondary modes of operation are realignment, directional gyro drift update and navigation/calibration.

The initialization mode controls sequencing of the system upon power application until the gyro wheel is up to speed and the gyro input axis is rotated from a gyrocompassing (north seeking) mode to a directional gyro (navigation) mode. The gyrocompassing mode features a "coarse" and "fine" align mode. The "coarse" align mode determines approximate north and the "fine" align mode determines north within a predetermined angular accuracy. At the completion of the "fine" align mode the input axis of the gyro is translated to a directional gyro orientation and gyro drift measurements are made to improve navigation performance.

At any time the system may be placed into a waypoint navigation mode. This mode allows a preselection of up to three destination locations and provides range and bearing information to the vehicle operator for vehicle steering to the desired location.

The system realignment mode can be effected at any time when the vehicle is stationary. This features two-step gyrocompassing via a two position "fine" arrangement which effectively takes a single rate average in two distinct positions for updating vehicle heading which is immune to gyro bias magnitude.

Directional gyro drift is automatically updated whenever the vehicle is stationary and the system is in the navigational mode. The updated drift information is used for azimuth compensation when the vehicle moves. Drift is obtained by a microprocessor taking time weighted measurements of heading via a coarse and fine resolver arrangement.

DETAILED DESCRIPTION OF THE INVENTION

Figure 1:
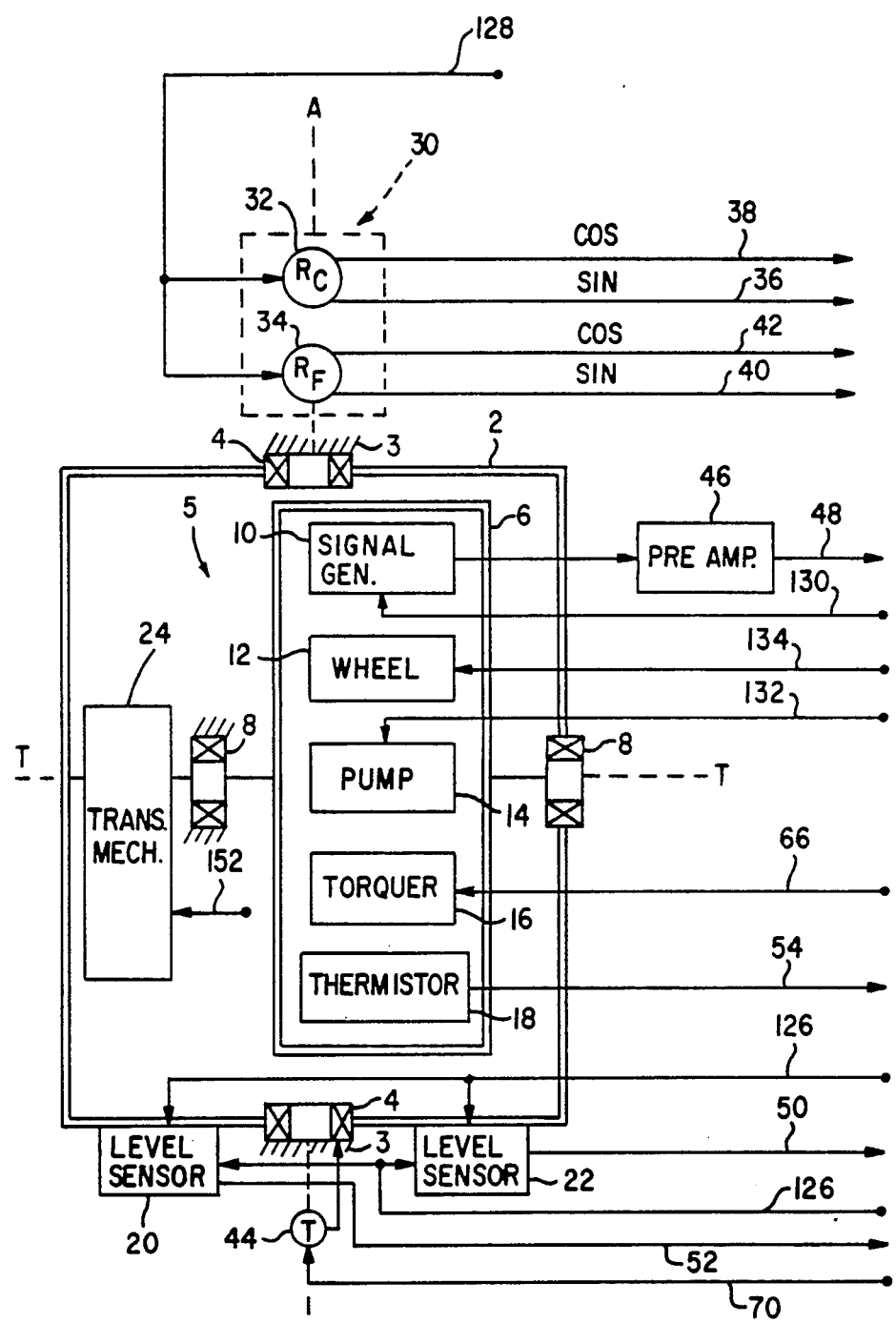
FIG. 1 is a block diagram illustrating a gyro platform arrangement according to the invention.

With reference to FIG. 1, an azimuth gimbal is designated by the numeral 2. Gimbal 2 is journalled in a case 3 via bearings or pivots 4 for displacement about an azimuth-Axis A—A. Case 3 is mounted in a vehicle (not otherwise shown).

A single degree of freedom, inertial grade liquid bearing gyro is designated generally by the numeral 5 and includes a gimbal 6 journalled in azimuth gimbal 2 via bearings or pivots 8 for displacement about a transfer axis T—T. Gyro 5 is of a conventional type including a signal generator or pickoff 10, a gyro wheel 12, a liquid pump 14, a torquer 16 and a temperature compensating thermistor 18.

A roll level sensor 20 and an elevation level sensor 22 are supported by azimuth gimbal 2. Level sensors 20 and 22 may be conventional electrolytic switches of the type well known in the art.

Gyro 5 is used in two modes. During a north align (gyrocompassing) mode, gyro 5 is operated as a strapped-down platform rate sensor with its input axis moved through a specific attitude in a plane defined by the longitudinal and lateral axes of the vehicle. During this mode sensors 20 and 22 are used to compensate for vehicle tilt. After gyrocompassing, the input axis of the gyro is rotated 90 degrees while azimuth gimbal 2 is caged by a position servo (not otherwise shown). In this mode, which is designated as a navigation (directional gyro) mode, gyro 5 is used in a conventional manner to stabilize azimuth gimbal 2.

The aforenoted input axis rotation is accomplished via a transfer mechanism designated generally by the numeral 24. Transfer mechanism 24 may be of the type described and claimed in commonly assigned U.S. Pat. No. 4,383,452 for a Transfer Mechanism For a Gyroscope Device, issued on May 17, 1983 to P. Imbeninato and R. Wolf. The description of said transfer mechanism is incorporated herein by reference.

A resolver arrangement designated generally by the numeral 30 is coupled to azimuth gimbal 2. Resolver arrangement 30 includes a "coarse" resolver ($R_C$) 32 and a "fine" resolver ($R_F$) 34. Resolver 32 provides signals at output conductors 36 and 38 corresponding to the sine and cosine of the resolver shaft angle for establishing the approximate (coarse) location of true north without the aid of external references. Resolver 34 provides signals at output conductors 40 and 42 corresponding to the sine and cosine of the resolver shaft angle for establishing true north to a prescribed (fine) angular accuracy, as will now be understood.

Azimuth gimbal 2 is driven by a torquer 44. With the arrangement shown, i.e. resolver arrangement 30, discrete measurements are used as opposed to continuously driving gimbal 2 about azimuth Axis A—A. It will be recognized that at the beginning of the north align mode azimuth gimbal 2 is caged at its last attitude (which is arbitrary). The input axis of gyro 5 is rotated into a level plane. The gyro is now operated as a rate sensor by closing an analog torque to balance loop as will hereinafter be understood.

Signal generator 10 provides a signal which is applied to a preamplifier 46, and which preamplifier 46 provides a signal at an output conductor 48. Level sensor 20 provides a signal at an output conductor 52 and level sensor 22 provides a signal at an output conductor 50. Thermistor 18 provides a temperature compensating signal at an output conductor 54.

Figure 2:
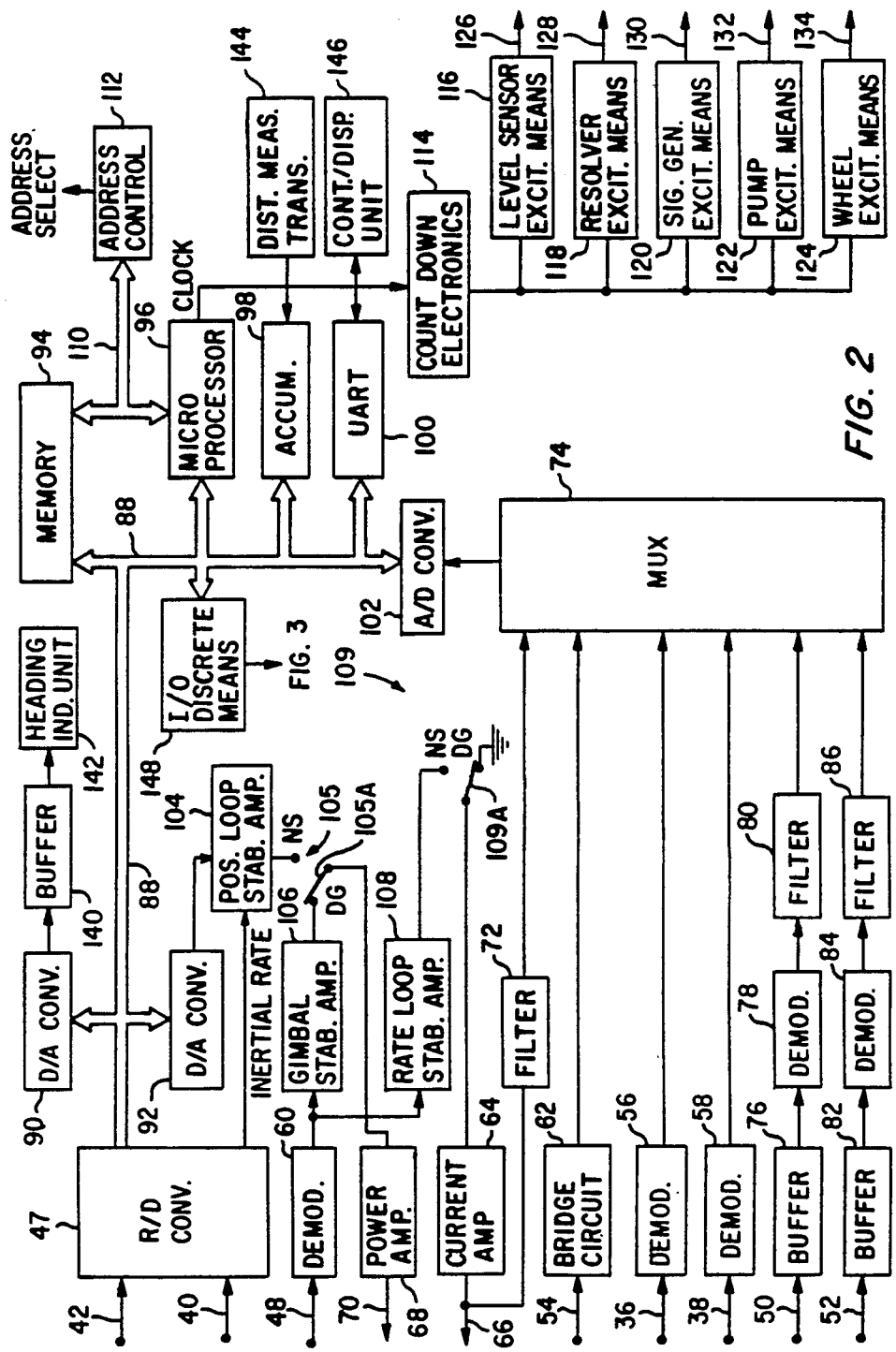
FIG. 2 is a block diagram illustrating an electronics arrangement according to the invention, and further illustrating a control/display unit, a distance measuring transducer and a heading indicator unit in association therewith.

With reference now to FIG. 2, output conductors 40 and 42 leading from resolver 34 are connected to a resolver to digital (R/D) converter 47 which converts the resolver signals to digital signals. Output conductors 36 and 38 leading from resolver 32 are connected to demodulators 56 and 58, respectively, whereby the resolver outputs are demodulated. Output conductor 48 leading from preamplifier 46 is connected to a demodulator 60 which demodulates the signal therefrom.

Output conductor 54 leading from thermistor 18 is connected to a conventional bridge circuit 62. A current amplifier 64 provides a signal at an output conductor 66, and which output conductor is connected to torquer 16 (FIG. 1) for applying the signal thereto. A power amplifier 68 provides a signal at an output conductor 70, and which output conductor 70 is connected to torquer 44 for applying the signal thereto.

Output conductor 66 from current amplifier 64 is connected to a filter 72 and filter 72 is connected to a multiplexer 74. Bridge circuit 62, demodulator 56 and demodulator 58 are likewise connected to multiplexer 74. The signal at output conductor 50 leading from level sensor 22 is applied to a buffer 76 and therefrom to a demodulator 78. Demodulator 78 provides a signal which is applied to filter 80. Filter 80 is connected to multiplexer 74.

The signal at output conductor 52 leading from level sensor 20 is applied to a buffer 82 and therefrom to a demodulator 84. Demodulator 84 is connected to a filter 86 and filter 86 is connected to multiplexer 74.

An address and data bus 88 communicates with resolver to digital (R/D) converter 47 and with digital to analog (D/A) converters 90 and 92. Bus 88 communicates with a memory 94, a microprocessor 96, an accumulator 98 and a universal asynchronous receiver/transducer (UART) 100. Bus 88 communicates with an analog to digital (A/D) converter 102 which is connected to multiplexer 74 for receiving the output therefrom.

R/D converter 47 and D/A converter 92 are connected to a position loop stabilization amplifier 104. R/D converter 47 applies an inertial rate signal to position loop stabilization amplifier 104.

Position loop stabilization amplifier 104 is connected to a terminal NS (north seeking) of a switch 105. Switch 105 has a terminal DG (directional gyro). Demodulator 60 is connected to a gimbal stabilization amplifier 106 and to a rate loop stabilization amplifier 108. Gimbal stabilization amplifier 106 is connected to terminal DG of switch 105 and rate loop stabilization amplifier 108 is connected to a terminal NS (north seeking) of a switch 109. Switch 109 has a grounded terminal DG (directional gyro). Current amplifier 64 is connected to arm 109A of switch 109. Power amplifier 68 is connected to arm 105A of switch 105.

Memory 94 communicates through an input/output bus 110 with microprocessor 96 and communicates with an address control 112 which applies an address select signal to appropriate components of the invention as will be understood. Microprocessor 96 provides a clock output which is applied to countdown electronics 114. Countdown electronics 114 is connected to a level sensor exitation means 116; a resolver exitation means 118; a signal generator exitation means 120; a pump exitation means 122; and a wheel exitation means 124.

Level sensor exitation means 116 provides a signal at an output conductor 126 for exciting level sensors 20 and 22; resolver exitation means 118 provides a signal at an output conductor 128 for exciting resolvers 32 and 34; signal generator exitation means 120 provides a signal at an output conductor 130 for exciting signal generator 10; pump exitation means 122 provides a signal at an output conductor 132 for exciting pump 14; and wheel exitation means 124 provides a signal at an output conductor 134 for exciting wheel 12.

A DC/DC converter (not otherwise shown) receives power from an external power source (also not otherwise shown) for applying power to appropriate components of the invention in a conventional manner as will now be understood.

The signal from D/A converter 90 is applied to a buffer 140 and therefrom to a heading indicator unit 142. A distance measuring transducer 144, which may be a conventional odometer, provides a signal corresponding to the distance travelled by the vehicle and applies said signal to accumulator 98. A control/display unit 146 is connected through a bundle of input/output conductors to UART 100.

Control/display unit 146 is used to provide the operator of the vehicle with the ability to control, and to provide data commands to and display data from the system. The data command inputs to the system are in the form of initial position, destination positions and distance measuring transducer scale factors. Display data outputs from the system are in the form of present position, present vehicle heading and vehicle verticality.

An input/output (I/O) discrete means 148 communicates via bus 88 with microprocessor 96. I/O discrete means 148 provides discrete outputs which are applied to appropriate components of the invention as will next be described with reference to FIG. 3.

Figure 3:
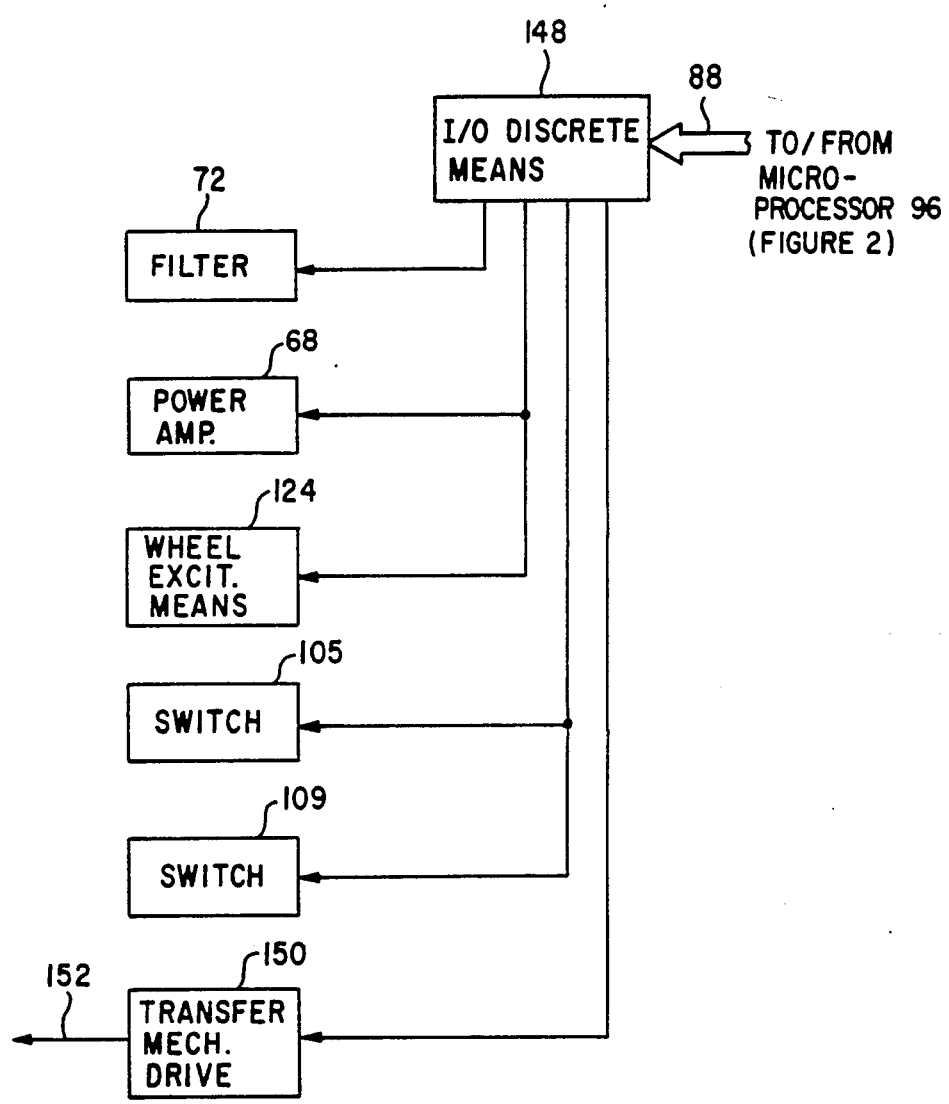
FIG. 3 is a block diagram illustrating the application of discrete outputs provided by an input/output discrete means shown in FIG. 2 to appropriate components of the invention.

Thus, with specific reference to FIG. 3, I/O discrete means 148 provides a discrete output which is applied to filter 72 and provides another discrete output which is applied to power amplifier 68 and to wheel exitation means 124. I/O discrete means 148 provides still another discrete output which is applied to switches 105 and 109, and provides yet another discrete output which is applied to a transfer mechanism drive 150. Transfer mechanism drive 150 in turn provides a drive output at an output conductor 152, and which drive output is applied to transfer mechanism 24 (FIG. 1) via conductor 152.

OPERATION OF THE INVENTION

In operating the invention power to the system is first turned on. This initializes microprocessor 96 and input/output discrete means 148 provides its discrete input at a logic "high" is applied to wheel exitation means 124, whereby gyro wheel 12 receives a high voltage starting input. At the same time, filter 72 receives a discrete input at a logic "low"; power amplifier 68 receives a discrete input at a logic "low" i.e., the amplifier is in the "off" condition; switches 105 and 109 receive discrete inputs at a logic "low", whereby the respective switch arms 105A and 109A are adjacent the north seeking (NS) switch terminals; and transfer mechanism 24 receives an input through transfer mechanism drive 150 in response to a discrete output at a logic "low" from I/O discrete means 148, whereby gyro 5 is in the north seeking mode.

Thereafter, wheel exitation means 124 receives a discrete output at a logic "low" for driving gyro wheel 12 in a "run" mode. In this connection it will be understood that more power is required to start wheel 12 than is required to run the wheel.

The resolver gimbal loop is then closed via a discrete input at a logic "high" being applied to power amplifier 68.

Microprocessor 96 reads temperature as provided by thermistor 18; tilt as provided by level sensors 20 and 22; and inertial rate as provided by filter 72. The gyro position loop is rotated 90 degress via microprocessor 96 and D/A converter 92 in the structural relationship with position loop stabilization amplifier 104 as illustrated in FIG. 2. Temperature, tilt and inertial rate are again read by microprocessor 96 which is programmed in a conventional manner to provide a "coarse" estimate of north.

The gyro position loop is then rotated to the coarse north estimate plus 180 degrees. Filter 72 receives a discrete input at a logic "high" from I/O discrete means 148. Microprocessor 96 again reads temperature, tilt and inertial rate and provides a first of two "fine" inertial readings. A second position, 180 degrees away, is then commanded. A second "fine" reading is then obtained. Microprocessor 96 then computes a "fine" estimate of north using both "fine" inertial measurements.

Transfer mechanism 24 is driven via transfer mechanism drive 150 and the output therefrom at conductor 152 in response to a discrete output from I/O discrete means 148 at a logic "high" to rotate the axis of gyro 5, whereby said axis is in a directional gyro or navigational mode. Switches 105 and 109 receive discrete outputs at a logic "high", whereby the respective switch arms 105A and 109A are controlled via amplifiers 106 and 108, respectively, to be adjacent the directional gyro (DG) terminals. Directional gyro drift is determined by microprocessor 96.

As illustrated in FIG. 2, heading indicator unit 142 is controlled via microprocessor 96 and receives a signal from buffer 140 proportional to the "fine" reading of north plus the change in resolver heading, and provides an indication thereof to an operator of the vehicle.

There has thus been described a relatively low cost moderate accuracy land navigation system for tactical vehicle applications. The invention features a single axis (azimuth) system which provides two dimensional UTM coordinates i.e. northings and eastings. A single degree of freedom gyroscope is used for both north seeking and navigational (directional gyro) modes. Simple level sensors are used for tilt measurement so as to eliminate excessive gimballing as might otherwise be the case. Temperature compensation is achieved through temperature modelling via a thermistor rather than by high power temperature control as might also otherwise be the case.

As will now be understood, drift is obtained by microprocessor 96 taking time weighted measurements of bearing via coarse and fine resolver arrangement 30. Range and bearing information for steering the vehicle to a desired destination and system realignment is achieved via the two position "fine" arrangement as described.

With the above description of the invention in mind reference is had to the claims appended hereto for a definition of the scope of the invention.

What is claimed is:

1. A gyrocompass navigation system for land vehicles characterized by:
   a case mounted in a vehicle;
   a first gimbal journalled in the case for displacement about a first axis;
   a gyro including a second gimbal journalled in the first gimbal for displacement about a second axis;
   the gyro being initially in a gyrocompassing mode, said gyro having an input axis which moves in a plane defined by the longitudinal and lateral axes of the vehicle;
   means for displacing the first gimbal about the first axis;
   means coupled to the first gimbal and responsive to the displacement thereof about the first axis for providing signals corresponding to the displacement of the longitudinal axis of the vehicle from true north, said signals corresponding to the heading of the vehicle;
   means coupled to the second gimbal for rotating the gyro input axis substantially ninety degrees, with the gyro thereupon stabilizing the displacement of the first gimbal about the first axis and being rendered in a navigation mode;
   means coupled to the first gimbal for detecting gyro drift and for compensating for said drift;
   means for providing signals corresponding to the distance travelled by the vehicle; and
   means connected to the vehicle distance signal means and the vehicle heading signal means and responsive to the signals therefrom for providing the present position of the vehicle.

2. A system as described by claim 1, wherein the means coupled to the first gimbal and responsive to the displacement thereof about the first axis for providing signals corresponding to the displacement of the longitudinal axis of the vehicle from true north is characterized by:
  resolver means including a "coarse" resolver and a "fine" resolver;
  the "coarse" resolver providing signals corresponding to a "coarse" location of true north;
  the "fine" resolver providing signals corresponding to a "fine" location of true north within a predetermined angular accuracy; and
  means connected to the "coarse" and "fine" resolvers and responsive to the signals therefrom for providing the signals corresponding to the displacement of the vehicle from true north, said signals corresponding to the heading of the vehicle.

3. A system as described by claim 2, further characterized by:
  a normally open loop coupling the resolver means to the first gimbal;
  means for closing said normally open loop and for providing vehicle inertial rate signals;
  the gyro including temperature sensor means for providing temperature signals;
  level sensor means coupled to the first gimbal for providing vehicle tilt signals;
  means for reading the inertial rate signals, the temperature signals and the vehicle tilt signals when the gyro is in the gyrocompassing mode;
  the gyro including a gyro position loop;
  means for rotating the gyro position loop substantially ninety degrees; and
  means for reading the inertial rate signals, the temperature signals and the vehicle tilt signals after the gyro position loop is rotated and for providing signals corresponding to a "coarse" estimate of true north.

4. A system as described by claim 3, further characterized by:
  the means for rotating the gyro position loop rotating said loop to the "coarse" estimate of true north plus substantially one hundred eighty degrees;
  the signal reading means reading the inertial rate signals, the temperature signals and the vehicle tilt signals after said rotation of the gyro position loop for providing first signals corresponding to a first "fine" measurement of true north;
  the means for rotating the gyro position loop rotating said loop an additional one hundred eighty degrees;
  the signal reading means reading the inertial rate signals, the temperature signals and the vehicle tilt signals after said last mentioned rotation of the gyro position loop for providing second signals corresponding to a second "fine" measurement of true north; and
  means responsive to the first and second signals for providing a "fine" estimate of true north.

5. A system as described by claim 4, further characterized by:
  means for actuating the means coupled to the second gimbal for rotating the gyro input axis substantially ninety degrees; and
  means for energizing said actuating means for rendering the gyro in a navigation mode after the second signals corresponding to a second "fine" measurement of true north have been provided.

6. A system as described by claim 4, wherein the means connected to the vehicle distance signal means and the vehicle heading signal means and responsive to the signals therefrom for providing the present position of the vehicle is characterized by:
  means responsive to the first signals corresponding to the first "fine" measurement of true north and to the second signals corresponding to the second "fine" measurement of true north for providing range and bearing information for steering the vehicle to a desired destination.

7. A system as described by claim 4, including system realignment means characterized by:
  means responsive to the first signals corresponding to the first "fine" measurement of true north and to the second signals corresponding to the second "fine" measurement of true north for taking a single rate average in two distinct positions for udating vehicle heading, said updated vehicle heading immune to gyro bias magnitude.

8. A system as described by claim 3, wherein the level sensor means coupled to the first gimbal for providing vehicle tilt signals is characterized by:
  a roll axis electrolytic switch for providing roll axis vehicle tilt signals; and
  an elevation axis electrolytic switch for providing elevation axis vehiclt tilt signals.

9. A system as described by claim 3, wherein the temperature sensor means is characterized by:
  a temperature compensating thermistor for providing temperature modelling.

10. A system as described by claim 2, characterized by:
  the resolver means providing signals corresponding to a change in vehicle heading; and
  heading indicator means connected to the resolver means and responsive to the signals therefrom corresponding to the "fine" location of true north and the signals corresponding to the change in vehicle heading, and providing an indication thereof to an operator of the vehicle.

11. A system as described by claim 2, wherein the means coupled to the first gimbal for detecting gyro drift and for compensating for said drift is characterized by:
  means connected to the "coarse" and "fine" resolvers in the resolver means for taking time weighted measurements of vehicle heading via said "coarse" and "fine" resolvers.

12. A system as described by claim 1, further characterized by:
  the first gimbal being an azimuth gimbal;
  the first axis being an azimuth axis; and
  the second axis being substantially normal to the first axis.

* * * * *